(12) United States Patent
Moisanen et al.

(10) Patent No.: US 8,880,020 B2
(45) Date of Patent: Nov. 4, 2014

(54) METHOD, AND APPARATUS FOR ATTEMPTING AN ECALL REGARDLESS OF RESPONSE TO A LOCATION UPDATE REQUEST

(75) Inventors: Matti Moisanen, Oulu (FI); Toni Tirkkonen, Oulunsalo (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/245,959

(22) Filed: Sep. 27, 2011

(65) Prior Publication Data

US 2013/0078941 A1 Mar. 28, 2013

(51) Int. Cl.
*H04W 4/22* (2009.01)
*H04W 76/00* (2009.01)
*H04M 3/00* (2006.01)
*H04W 24/00* (2009.01)
*H04W 60/04* (2009.01)

(52) U.S. Cl.
CPC .............. *H04W 76/007* (2013.01); *H04W 4/22* (2013.01); *H04W 60/04* (2013.01); *H04M 3/00* (2013.01); *H04W 24/00* (2013.01)
USPC ..................... 455/404.2; 455/404.1; 455/420; 455/456.1; 455/521; 455/550.1; 370/328; 370/329; 370/338

(58) Field of Classification Search
CPC ......... H04M 3/00; H04W 24/00; H04W 4/22; H04W 60/04; H04W 76/007
USPC ........ 455/404.1, 404.2, 456, 456.1, 457, 439, 455/435.1–453; 370/356, 466, 329
See application file for complete search history.

(56) References Cited

U.S. PATENT DOCUMENTS

| | | | |
|---|---|---|---|
| 7,428,414 B2 * | 9/2008 | Kumar et al. ............. | 455/432.1 |
| 2004/0121755 A1 | 6/2004 | Hurtta | |
| 2005/0085257 A1* | 4/2005 | Laird et al. ................ | 455/550.1 |
| 2008/0102784 A1* | 5/2008 | Mittal et al. .............. | 455/404.1 |
| 2008/0311881 A1* | 12/2008 | Taaghol et al. ........... | 455/404.2 |
| 2009/0253403 A1 | 10/2009 | Edge | |
| 2009/0298458 A1 | 12/2009 | Bakker et al. ............. | 455/404.1 |
| 2011/0086609 A1 | 4/2011 | Buehler et al. ............ | 455/404.2 |
| 2011/0287733 A1 | 11/2011 | Cepuran et al. ........... | 455/404.1 |

OTHER PUBLICATIONS

3GPP TS 24.008 V10.3.0 (Jun. 2011), Technical Specification, 3$^{rd}$ Generation Partnership Project; Technical Specification Group Core Network and Terminals; Mobile Radio Interface Layer 3 Specification; Core Network Protocols; Stage 3 (Release 10), (pp. 41, 54, -55, 63-68, 88, 91-108, 563-565, and 608).

(Continued)

*Primary Examiner* — Addy Anthony
*Assistant Examiner* — Babar Sarwar
(74) *Attorney, Agent, or Firm* — Stanton IP Law

(57) ABSTRACT

A wireless device transmits a request message for receipt by a wireless network to at least one of request attachment of the wireless device to the wireless network and request location updating for the wireless device from the wireless network. The wireless device subsequently attempts an emergency call to the wireless network regardless of whether or not the wireless device receives a response to the request. In this way, the wireless device can make the emergency call promptly and without significant delay.

16 Claims, 3 Drawing Sheets

(56) References Cited

OTHER PUBLICATIONS

Renato Filjar, et al; XP031904340: E-Call: Automatic notification of a road traffic accident. MIPRO 2011 Proceedings of the 34th International Convention. 20110523. ISBN 987-1-4577-0996-6, 1-4577-0996-1 (6 pages).

Alcatel-Lucent et al: "3GPP TSG WG1 Meeting # 73; C1-113752; PSAP Callback for eCalls" 3GPP Draft; C1-113752 (Was C1-113677_C1-113118) 24.008 PSAP Callback ecall, 3rd Generation Partnership Project (3GPP), Mobile Competence Centre; 650, Route Des Lucioles; F-06921 Sophia-Antipolis Cedex; France; vol. CT0WG1, No. Malta 20110822, Aug. 29, 2011, XP050534220, [retrieved on Aug. 29, 2011] p. 4, par. 4.4.7 eCall inactivity procedure.

Qualcomm Europe: "3GPP TSG WG1 Meeting #54, C1-082348;Support of Expedited Location Updating for an eCall Only UE";3GPP Draft;C1-082348; 3rd Generation Partnership Project (3GPP), Mobile Competence Centre;650 Route Des Lucioles;F-06921 Sophia-Antipolis Cedex;France; vol. CT WG1 No. Zagreb, Croatia; 20080616, Jun. 16, 2008, XP050029616 [retrieved on Jun. 16, 2008] p. 2, par. 4.4.4.1 Location updating initiation by mobile station; p. 3, par. 10.5.3.5 Location updating type; p. 3 Table10.5.93.

Qualcomm Europe: 3GPP TSG WG1 Meeting #53; C1-081685; Discussion—Minimal MM signlaing for eCall Only Terminals:, 3GPP Draft; C1-081685, 3rd Generation Partnership Project (3GPP), Mobile Competence Centre; 650, Route Des Lucioles; F-06921 Sophia-Antipolis Cedex; France; vol. CT WG1, No. Cape Town; 20080515, May 15, 2008, XP050028920, [retrieved on May 15, 2008] the whole document.

* cited by examiner

METHOD, AND APPARATUS FOR ATTEMPTING AN ECALL REGARDLESS OF RESPONSE TO A LOCATION UPDATE REQUEST

TECHNICAL FIELD

The present invention relates to a method of operating a wireless device and apparatus for a wireless device.

BACKGROUND

The following abbreviations are used in the present specification:
CM Connection Management
GERAN GSM-Enhanced Data Rates for Global Evolution
GSM Global System for Mobile communications
MSD Minimum Set of Data
MM Mobility Management
PSAP Public Safety Answering Point
RR Radio Resource
RRC Radio Resource Connection
UE User Equipment
UMTS Universal Mobile Telecommunications Systems
UTRAN UMTS Terrestrial Radio Access Network There have been proposals for an in-vehicle emergency call service such that if for example a vehicle is involved in a (severe) collision, an emergency call over a wireless network can be made promptly so that, in turn, emergency services can be deployed quickly if necessary. The emergency call can be made or at least initiated manually by a human operator or automatically following detection of the collision by suitable sensors in the vehicle.

In Europe for example, there is currently a proposal from the European Commission for a service of this type, which is referred to as "eCall" and shown schematically in overview in FIG. 1. This service is said to be expected to save hundreds of lives a year because of the rapid deployment of the emergency services and because the exact location of the vehicle 1 can be transmitted by a so-called eCall device which is installed in the vehicle 1. The eCall device of this proposal is a wireless device that can establish an emergency voice call 2 (referred to as "E112") and transfer a data message 3 (the prescribed minimum set of data or MSD) over the cellular network serviced by a radio mast 4 to a PSAP (Public Safety Answering Point) 5. The MSD 3 can include for example vehicle location information (optionally obtained using the Global Positioning System GPS 6), time stamp, number of passengers, Vehicle Identification Number (VIN), and other relevant accident information. It is expected that the eCall MSD information will be sent either immediately following the establishment of the voice call or at any point later during the voice call. The PSAP 5 is an emergency call centre responsible for answering calls made to an emergency telephone number for police, firefighting and ambulance services, and has telephone operators who are also usually responsible for dispatching these emergency services. It should be noted that such emergency devices, including eCall devices in particular, can be used in other applications and are not limited for use in or associated with vehicles.

In general, a wireless device (or "User Equipment" or UE, such as mobile or cell phones, including so-called "smart phones", and suitably equipped personal digital assistants, pagers, tablet and laptop computers, etc.) can attempt an emergency call without being registered with and without first attempting to register with a network. In the specific case of an eCall device, the eCall device (or more specifically the Mobility Management or MM layer in the eCall device) can be in the "eCALL INACTIVE" state in which it is not registered to any network (see for example the technical specification of the Third Generation Partnership Project 3GPP TS 24.008 V10.3.0). However, it may be desirable, and may even become mandatory, for the eCall device to support PSAP callback, i.e. the emergency telephone operator can call back after release of the emergency call. In such a case, network registration by the eCall device is required. The current proposal therefore is that the registration must be performed by the eCall device before the call. However, with current procedures and specifications, this can cause the emergency call to be delayed or even to fail to be made successfully at all.

SUMMARY

In a first exemplary embodiment of the invention, there is a method of operating a wireless device, the method comprising: the wireless device transmitting a request message for receipt by a wireless network to at least one of request attachment of the wireless device to the wireless network and request location updating for the wireless device from the wireless network; and, the wireless device subsequently attempting an emergency call to a wireless network regardless of whether or not the wireless device receives a response to the request.

In a second exemplary embodiment of the invention, there is apparatus comprising: at least one processor; and at least one memory including computer program code; the at least one memory and the computer program code being configured to, with the at least one processor, cause a wireless device that includes the apparatus at least to: transmit a request message for receipt by a wireless network to at least one of request attachment of the wireless device to the wireless network and request location updating for the wireless device from the wireless network, and to subsequently attempt an emergency call to a wireless network regardless of whether or not the wireless device receives a response to the request.

Further features and advantages of the invention will become apparent from the following description of preferred embodiments of the invention, given by way of example only, which is made with reference to the accompanying drawings.

DETAILED DESCRIPTION

Figure 1:
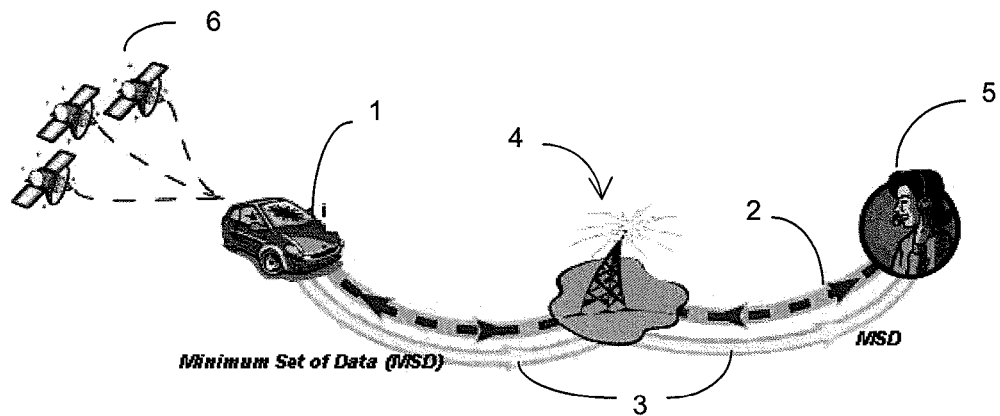
FIG. 1 shows schematically an overview of the eCall procedure.

Exemplary embodiments of the present invention provide that a wireless device or UE, including in particular an eCall device, attempts registration with a wireless network prior to making an emergency call, but attempts to make the emergency call regardless, improving the likelihood of success of the emergency call and of the emergency call being made promptly.

In general, the request message and the emergency call may be made to the same network or, in some cases, to different networks (whether using different wireless technologies or standards, or just different cells of a cellular network for example).

In an exemplary embodiment, the wireless device attempts the emergency call after the wireless device has transmitted a single said request message. This helps to minimise delays in the emergency call being made. In an embodiment, the wireless device attempts the emergency call a predetermined period of time after transmitting the request message. The time period can be set to allow some time for receipt of a response, but is nevertheless preferably kept short in order again to minimise delays in the emergency call being made.

In an exemplary embodiment, the wireless device attempts the emergency call after the wireless device has transmitted a plurality of request messages. The device may for example be permitted to make a number of attempts, though this is preferably kept to a minimum in order to prevent delays in the emergency call being made. In an embodiment, the wireless device attempts the emergency call a predetermined period of time after transmitting the last of the request messages. In another embodiment, the wireless device transmits the plurality of request messages within a predetermined period of time, and the wireless device attempts the emergency call after expiry of said predetermined period of time regardless of whether or not the wireless device receives a response to one of the requests.

In an exemplary embodiment, the wireless device attempts the emergency call immediately upon receipt of a negative response from a said network which rejects the request for attachment or the request for location updating. In the case of receiving a rejection from the network, it can be decided not to delay further the attempt to make the emergency call, and this allows the emergency call to be made as soon as possible in such a case.

In an exemplary embodiment, the wireless device transmits the request message in response to detection of an emergency. The detection of an emergency and also the triggering of the transmission of the request message may be carried out automatically, without requiring human input.

In an exemplary embodiment, the wireless device transmits a request message that requests location updating for the wireless device from a Universal Mobile Telecommunications System Terrestrial Radio Access Network (UTRAN) wireless network, in which an establishment cause for the location updating is set to a value "Emergency call". In another embodiment, the wireless device transmits a request message that requests location updating for the wireless device from a Global System for Mobile communications-Enhanced Data Rates for Global Evolution (GERAN) wireless network, in which an establishment cause for the location updating is set to a value "Emergency call". In either case, this gives the request message the highest priority in the wireless network.

The wireless device may be an in-vehicle device providing an in-vehicle emergency call service. The wireless device may however provide an emergency call service in other applications and fields.

There may also be provided a computer program comprising code such that when the computer program is executed on a computing device, the computing device is arranged to carry out a method as described above. The computer program may be stored on a non-transitory computer-readable storage medium and comprise a set of computer-readable instructions stored thereon.

Figure 2:
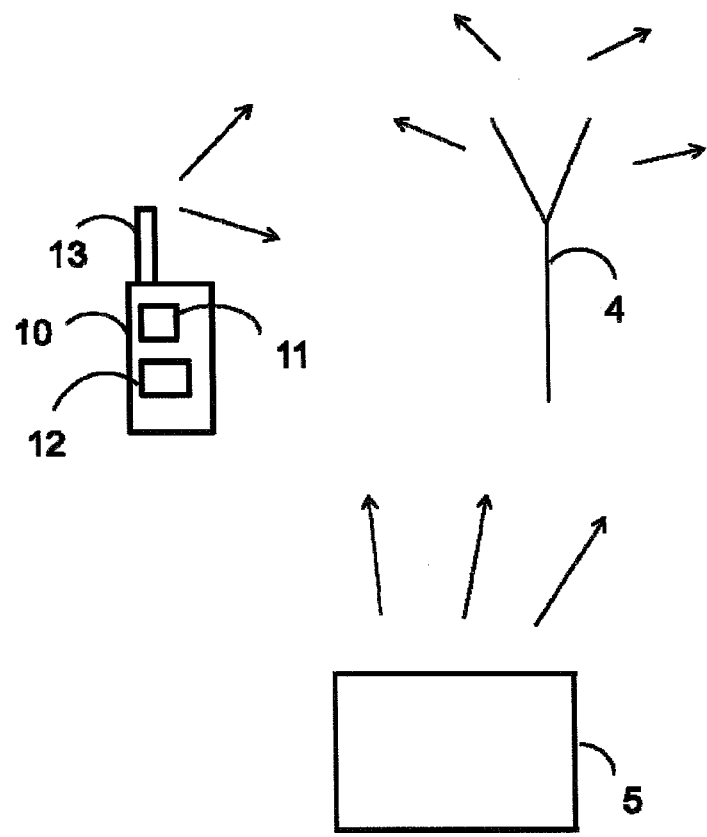
FIG. 2 shows schematically an example of a wireless device communicating via a wireless network with a PSAP.

Referring to FIG. 2, there is shown schematically an example of a wireless device 10 communicating with a wireless network. The wireless device 10 contains the necessary radio module 11, processor(s) and memory/memories 12, antenna 13, etc. to enable wireless communication with the network. The wireless device 10 in use is in communication with a wireless cellular network having coverage provided by a radio mast 4.

In a specific example of the present invention, the wireless device 10 is an in-vehicle device providing an in-vehicle emergency call service. A particular example is the so-called eCall service, in which case the wireless device 10 is termed an eCall device 10, which may be installed in a vehicle 1, such as a road vehicle as shown schematically in FIG. 1 and discussed generally above. FIG. 2 also shows schematically the PSAP (Public Safety Answering Point) 5 with which the eCall device 10 attempts to make contact in the event of an emergency (such as the vehicle 1 being involved in a collision) over the wireless network as discussed above. As noted above, such emergency devices, including eCall devices in particular, can be used in other applications and are not limited for use in or associated with vehicles.

In practice, the eCall device 10 (or more specifically the Mobility Management or MM layer provided by the processor 12 of the eCall device 10) will typically be in the "eCALL INACTIVE" service state, which is principally intended to minimise or avoid altogether the exchange of signals with the wireless network. In this service state, the eCall device 10 does not perform periodic updating; does not perform IMSI (International Mobile Subscriber Identity) detach; rejects any requests from Connection Management entities for Mobility Management connections except for emergency calls and calls to a non-emergency Mobile Station International Subscriber Directory Number for test and terminal reconfiguration services; does not perform normal location updating; and does not respond to paging (see for example the technical specification of the Third Generation Partnership Project 3GPP TS 24.008 V10.3.0). Thus, while in the eCALL INACTIVE state, the eCall device 10 may maintain awareness of a potential serving cell in a potential serving network but initiates no MM signalling with the network and ignores any paging requests. Significantly for present purposes, the eCall device 10 when in the eCALL INACTIVE service state is not registered to any network.

In the event of an emergency, such as for example the vehicle 1 being involved in a collision, an attempt to make an emergency call over the cellular network can be made using the eCall device 10. This can be initiated manually by a human operator or automatically, for example following detection of the collision by suitable sensors in the vehicle 1. As noted above, in many instances, it may be desirable for the eCall device 10 to support PSAP callback, i.e. the emergency telephone operator at the PSAP 5 can call the eCall device 10 back after release of the emergency call, to enable voice communication between the emergency telephone operator and the person or persons associated with the vehicle 1. Supporting PSAP callback may become a mandatory requirement. To enable PSAP callback, a process of network registration by the eCall device 10 will normally be required given that, at the time of the collision or other emergency, the eCall device 10 will typically have been in the "eCALL INACTIVE" service state in which it is not registered to any network. The current proposal is that this registration must be performed by the eCall device 10 before it attempts to make the emergency call. Such registration may be or require for example a location updating procedure, as used in for example GSM and UMTS systems, or an attach procedure, which may involve a location updating procedure.

In a conventional attach procedure, and more specifically a location updating procedure, as described in for example 3GPP TS 24.008 V10.3.0 mentioned above, a wireless device is seeking to update the registration of the actual Location Area of the wireless device in the network. The location area in a particular case is a set of cells in the network. In general, a wireless device performs location area updating procedure when it enters a cell that belongs to another location area from the one where the previous location updating was made, or when a wireless device is first switched on for example. The wireless device sends a LOCATION UPDATING REQUEST to the network or, more specifically, a network control apparatus. The "network control apparatus" is the overall apparatus that provides for general management and control of the network and connected devices. Such apparatus may in practice be constituted by several discrete pieces of equipment. As a particular example in the context of UMTS, the network control apparatus may be constituted by for example a so-called Radio Network Controller operating in conjunction with one or more Node Bs (which, in many respects, can be regarded as "base stations").

For any of a number of reasons, the location updating procedure may fail, or at least may fail initially. For example, the procedure can be rejected by the network, or there may be delays for example because of a non-responding network and several reattempts of the location updating procedure after, or there may be radio access problems for example during high load situations. In a conventional location updating procedure, the wireless device initiates the location updating procedure by sending a LOCATION UPDATING REQUEST message to the network, starts a timer (the timer T3210 of 3GPP TS 24.008 V10.3.0, which is 20 seconds in one example) and enters the state LOCATION UPDATING INITIATED. If the location updating procedure is not successful at the end of this time period (either because no response has been received from the network or because radio access problems occur), conventionally a further LOCATION UPDATING REQUEST is transmitted by the wireless device, and the timer is reset. To limit the number of location updating attempts made, an attempt counter is used, which counts the number of consecutive unsuccessful location update attempts and causes the location updating procedure to cease after a certain number of (failed) attempts. Moreover, depending on the reasons for the failure of the location updating procedure attempt, the wireless device may be placed in an MM IDLE service state for a period of time (the timer T3211 of 3GPP TS 24.008 V10.3.0, which is 15 seconds in one example) before making another location updating attempt. As yet another example, in the conventional procedure, if the wireless device receives a LOCATION UPDATING REJECT message from the network, in some cases yet another timer is started (as an example of 8 seconds duration) to delay the making of another location updating attempt in order to allow the wireless device to attempt to select a different network cell.

Thus, if these conventional procedures are followed for the attach or location updating procedure in the case of an emergency device, such as an in-vehicle or other eCall device 10 discussed above, the result may be that the attach or location updating procedure lasts a long time, which delays the making of the emergency call. It is well known that delays of even minutes in despatch of emergency services can have a serious impact on the chances of a successful outcome for the emergency services attending an incident, particularly in the case of firefighting and ambulance services. Moreover, in the procedure as proposed, the emergency call will not be made until the attach or location updating procedure has been successfully completed, which may prevent the emergency call being made altogether.

Accordingly, in accordance with one exemplary embodiment of the present invention, the wireless device 10 attempts to make an emergency call to a wireless network regardless of whether or not the wireless device receives a response to the request message that is sent to initiate the attach or location updating procedure, and in a preferred embodiment regardless of the content of any response if received. If a positive response from the network is received at the wireless device 10, then the wireless device 10 can proceed to make the emergency call as expected and as normal. However, if the wireless device 10 receives a negative response (such as LOCATION UPDATING REJECT message) from the network, or if the wireless device 10 receives no response, the wireless device 10 proceeds to attempt the emergency call regardless. In the preferred embodiment, the wireless device 10 does not for example attempt the attach or location updating procedure again, and specifically, in an embodiment, does not send any further LOCATION UPDATING REQUEST message to the network.

A timer in the wireless device 10 may be started when it first attempts the attach or location updating procedure (i.e. in an example, when the LOCATION UPDATING REQUEST message is sent). Such a timer is preferably of a relatively short duration such as between 10 to 30 seconds say (and may for example be the timer T3210 of 3GPP TS 24.008 V10.3.0, which is 20 seconds). If no response is received from the network during that time period, the wireless device 10 attempts the emergency call immediately, or at least very soon or as soon as possible, after the end of that time period. Moreover, the wireless device 10 may attempt the emergency call immediately, or at least practically immediately or at least very soon or as soon as possible, after receiving a negative response (such as LOCATION UPDATING REJECT message) from the network.

In an exemplary embodiment of the present invention, the wireless device 10 makes just one attempt of the attach or location updating procedure, i.e. the wireless device 10 sends a single request message requesting attachment of the wireless device to the wireless network or requesting location updating for the wireless device from the wireless network, prior to attempting the emergency call regardless of the outcome of the sending of that request. Nevertheless, though not preferred, it may be that the wireless device 10 makes more than one attempt of the attach or location updating procedure, with the subsequent attempt or attempt being made some time after the first or previous attempt, or some time after a negative response is received from the network. Such time is in each case preferably short, such as 20 seconds, and moreover the number of attempts is also preferably kept low so that for example a maximum of say two or three attempts is made in total. Nevertheless, as mentioned above, the wireless device 10 proceeds to attempt the emergency call regardless of the ultimate outcome of these attempts of the attach or location updating procedure. The wireless device 10 may for example attempt the emergency call a predetermined period of time following transmission of the last of the predetermined number of request messages for the attach or location updating procedure. As another alternative, the attach or location updating can be attempted for a certain period of time, e.g. for 30 seconds, and as many location updating attempts as possible can be made during that time, with the emergency call being made at the end of that period of time regardless of whether any response to the attach or location updating request is received.

Accordingly, in these embodiments a wireless device, such as an eCall device, attempts registration with a wireless network prior to making an emergency call, but attempts to make the emergency call regardless, improving the likelihood of success of the emergency call and of the emergency call being made promptly. It may be noted that this may prevent PSAP callback, i.e. the emergency telephone operator at the PSAP 5 being able (immediately) to call the eCall device 10 back after release of the emergency call, but it is deemed more important in this scenario that the eCall device 10 can make the emergency call regardless and can do so promptly and without delay. In the preferred embodiment, the wireless device 10 makes just one attempt of the attach or location updating procedure prior to attempting the emergency call.

In the case of the wireless network being a UTRAN access network, the RRC (Radio Resource Connection) establishment cause for the UTRAN RRC connection establishment (which is described in 3GPP TS 24.008 chapter L.1 and which indicates the reason for requesting the establishment of a connection) for the location updating can be set to the value "Emergency call". Correspondingly, in the case of the wireless network being a GERAN access network, the GERAN RR connection establishment cause (described in 3GPP TS 44.018 chapter 9.1.8) can be set to "Emergency call". In either case, this gives this connection establishment the highest priority in the wireless network.

Figure 3:
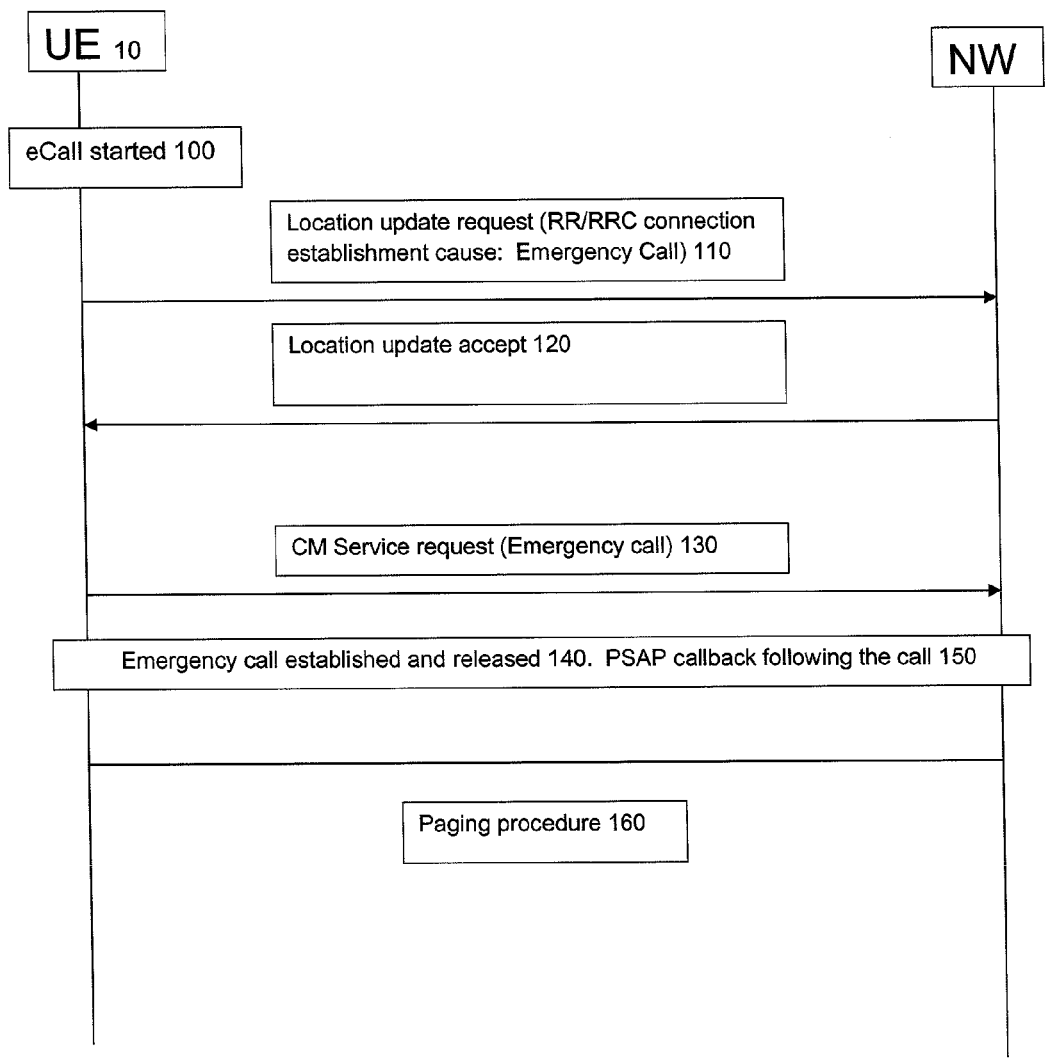
FIGS. 3 and 4 show schematic timing diagrams of examples of methods according to an embodiment of the present invention.
Figure 4:
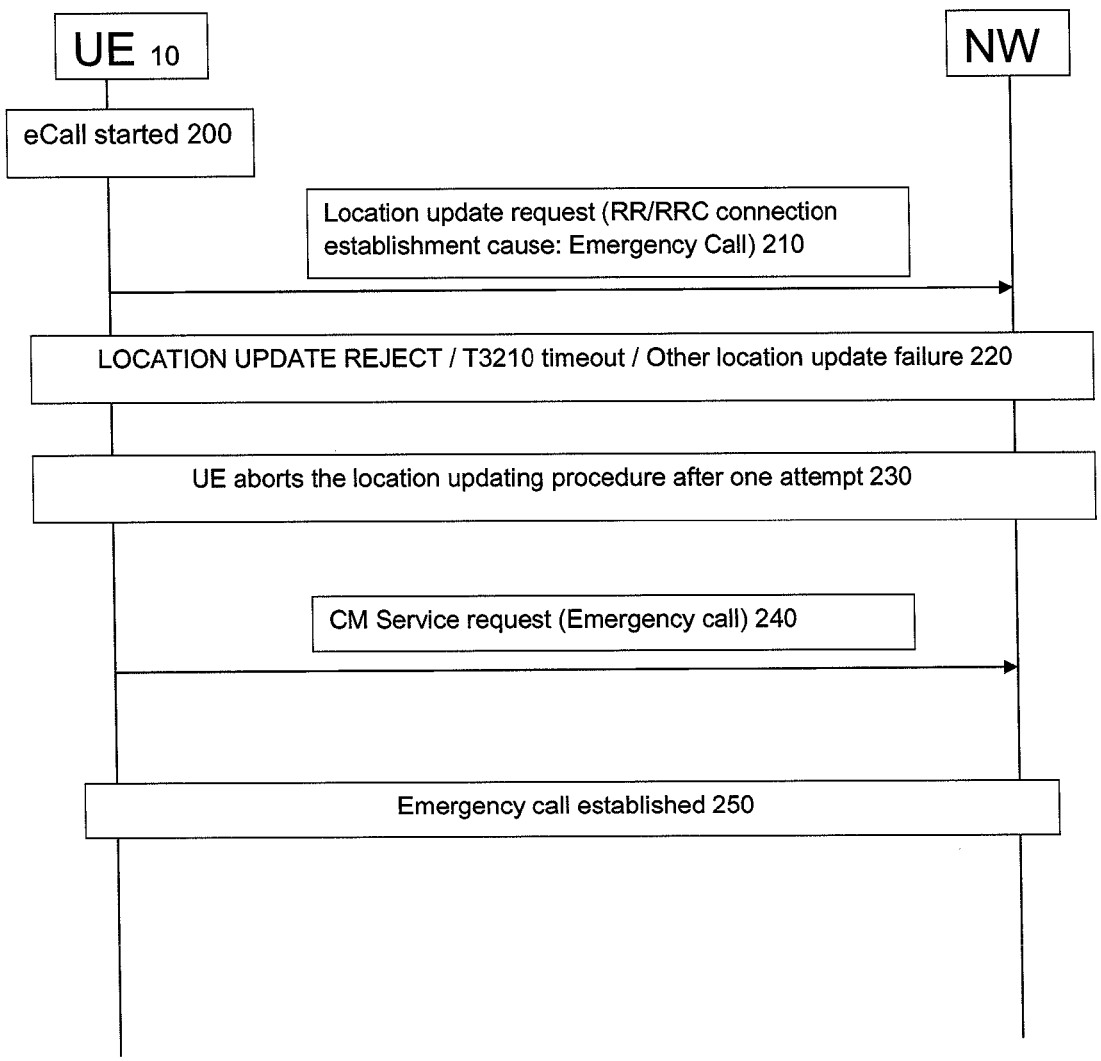

FIGS. 3 and 4 show schematic timing diagrams of examples of methods according to an embodiment of the present invention.

In FIG. 3, an eCall is initiated 100 by the eCall device or UE 10, either manually by a human operator or automatically, for example following detection of a collision of a vehicle in which the device 10 is fitted. The device 10 transmits 110 a location update request, with the RRC/RR connection establishment cause being set to the value Emergency Call, to the network. In this case, the location update request 110 is successful so the network sends a LOCATION UPDATE ACCEPT message 120 to the device 10. The device 10 can then attempt the emergency call, in this case by sending a CM (Connection Management) service request 130 to the network. The Emergency call can then be established and subsequently released 140. In this case, because the location update procedure was successful, the PSAP callback 150 can take place immediately following the release of the emergency call, with a paging procedure 160 taking place as conventional.

In the case shown in FIG. 4, again an eCall is initiated 200 by the eCall device or UE 10, either manually by a human operator or automatically. The device 10 transmits 210 a location update request, with the RRC/RR connection establishment cause being set to the value Emergency Call, to the network. In this case, however, the location update request is not successful 220. For example, the network may send a LOCATION UPDATING REJECT message, or the "location update response wait" timer (which may be the timer T3210 discussed above) may expire without any response being received, or for some other reason. Accordingly, the device 10 aborts the location updating procedure after one attempt 230 in this example and attempts the emergency call regardless, in this case again by sending a CM (Connection Management) service request 240 to the network. The Emergency call can then be established and subsequently released 250. In this case, because the location update procedure failed, the PSAP callback cannot take place (at least immediately).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, whilst specific examples have been given above of use in a UTRAN access network and a GERAN access network, examples of the present invention have application in other existing or future wireless technologies. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a wireless eCall device, the method comprising:
   the wireless eCall device transmitting, while in an eCall INACTIVE state in which the wireless eCall device is not registered to a wireless network, a request message for receipt by the wireless network to at least one of request attachment of the wireless eCall device to the wireless network and request location updating for the wireless eCall device from the wireless network; and,
   the wireless eCall device subsequently attempting an emergency call to the wireless network;
   regardless of whether or not the wireless eCall device receives a response to the request; and
   regardless of whether or not the wireless eCall device is registered to the wireless network.

2. The method according to claim 1, wherein the wireless eCall device attempts the emergency call after the wireless eCall device has transmitted a single said request message that requests location updating.

3. The method according to claim 2, wherein the wireless eCall device attempts the emergency call after receipt by the wireless eCall device of a negative response to, or after no response to, the single request message that requests location updating.

4. The method according to claim 3, wherein the wireless eCall device is an eCall-only device and attempts the emergency call immediately upon receipt of the negative response from the wireless network which rejects the single request message that requests location updating, or immediately after the no response from the wireless network to the single request message that requests location updating.

5. The method according to claim 4, wherein the wireless eCall device transmits the request message automatically in response to detection of an emergency by the wireless eCall device, the detection of the emergency occurring without human input to the eCall device.

6. The method according to claim 5, wherein the wireless eCall device transmits the request message that requests location updating for the wireless eCall device from a Universal Mobile Telecommunications System Terrestrial Radio Access Network (UTRAN) wireless network, in which an establishment cause for the location updating is set to a value "Emergency call".

7. The method according to claim 5, wherein the wireless device transmits the request message that requests location updating for the wireless eCall device from a Global System for Mobile communications-Enhanced Data Rates for Global Evolution (GERAN) wireless network, in which an establishment cause for the location updating is set to a value "Emergency call".

8. The method according to claim 5, wherein the wireless eCall device is installed in a vehicle and provides an in-vehicle call service.

9. An apparatus comprising:
at least one processor;
and at least one memory including computer program code;
the at least one memory and the computer program code being
configured to, with the at least one processor, cause a wireless eCall device that includes the apparatus at least to:
transmit a wireless network, while in an eCall INACTIVE state in which the wireless eCall device is not registered to a wireless network, a request message for receipt by the wireless network to at least one of request attachment of the wireless eCall device to the wireless network and request location updating for the wireless eCall device from the wireless network, and
subsequently attempt an emergency call to the wireless network
regardless of whether or not the wireless eCall device receives a response to the request; and
regardless of whether or not the wireless eCall device is registered to the wireless network.

10. The apparatus according to claim 9, wherein the at least one memory and the computer program code are configured to, with the at least one processor, cause the wireless eCall device that includes the apparatus to attempt the emergency call after the wireless eCall device has transmitted a single said request message that requests location updating.

11. The apparatus according to claim 10, wherein the at least one memory and the computer program code are configured to, with the at least one processor, cause the wireless eCall device that includes the apparatus to attempt the emergency call after receipt by the wireless eCall device of a negative response to, or after no response to, the single request message that requests location updating.

12. The apparatus according to claim 11, wherein the at least one memory and the computer program code are configured to, with the at least one processor, cause the wireless eCall device which is an eCall-only device that includes the apparatus to attempt the emergency call immediately upon receipt of the negative response from the wireless network which rejects the request for attachment or the single request message that requests location updating, or immediately after the no response from the wireless network to the single request message that requests location updating.

13. The apparatus according to claim 12, wherein the at least one memory and the computer program code are configured to, with the at least one processor, cause the wireless eCall device that includes the apparatus to transmit the request message automatically in response to detection of an emergency by the wireless eCall device, the detection of the emergency occurring without human input to the eCall device.

14. The apparatus according to claim 13, wherein the at least one memory and the computer program code are configured to, with the at least one processor, cause the wireless eCall device that includes the apparatus to transmit the request message that requests location updating for the wireless eCall device from a Universal Mobile Telecommunications System Terrestrial Radio Access Network (UTRAN) wireless network, in which an establishment cause for the location updating is set to a value "Emergency call".

15. The apparatus according to claim 13, wherein the at least one memory and the computer program code are configured to, with the at least one processor, cause the wireless eCall device that includes the apparatus to transmit the request message that requests location updating for the wireless eCall device from a Global System for Mobile communications-Enhanced Data Rates for Global Evolution (GERAN) wireless network, in which an establishment cause for the location updating is set to a value "Emergency call".

16. The apparatus according to claim 13, wherein the wireless eCall device that includes the apparatus is installed in a vehicle and provides an in-vehicle call service.

* * * * *

UNITED STATES PATENT AND TRADEMARK OFFICE
CERTIFICATE OF CORRECTION

PATENT NO. : 8,880,020 B2  
APPLICATION NO. : 13/245959  
DATED : November 4, 2014  
INVENTOR(S) : Matti Moisanen and Toni Tirkkonen Page 1 of 1

It is certified that error appears in the above-identified patent and that said Letters Patent is hereby corrected as shown below:

In the Claims

Claim 12, column 10, line 18: Replace "which rejects the request for attachment or the single request" with --which rejects the single request--.

Signed and Sealed this
Twenty-fourth Day of March, 2015

Michelle K. Lee
*Director of the United States Patent and Trademark Office*